United States Patent Office 3,644,632
Patented Feb. 22, 1972

3,644,632
HALOTHIETE-1,1-DIOXIDE AS ANTI-
INFLAMMATORY AGENTS
Melvin Harris Rosen, Madison, and Herbert Morton Blatter, Springfield, N.J., assignors to Ciba Corporation, Summit, N.J.
No Drawing. Filed Oct. 17, 1968, Ser. No. 768,546
Int. Cl. A61k 27/00
U.S. Cl. 424—275
1 Claim

ABSTRACT OF THE DISCLOSURE 2-halo-3-amino-2H-thiete-1,1-dioxides, e.g. those of the formula

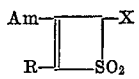

X=halogen
Am=dialkylamino or alkyleneimino
R=H or alkyl exhibit antiinflammatory effects.

SUMMARY OF THE INVENTION

The present invention concerns and has for its object the provision of new 2-halo-3-amino-2H-thiete-1,1-dioxides, more particularly of those of Formula I

in which X is a halogen atom, Am is di-lower alkylamino or lower alkyleneimino, R is hydrogen or lower alkyl, of corresponding pharmaceutical compositions and of methods for the preparation and application of these products. Said compositions are useful antiinflammatory agents in the treatment or management of arthritic and dermatopathologic conditions.

DESCRIPTION OF THE PREFERRED EMBODIMENTS

A halogen atom X is preferably chlorine or bromine, but represents also fluorine or iodine.
A lower alkyl group R is preferably methyl or ethyl, but also, for example, n- or i-propyl, -butyl, -pentyl, -hexyl or -heptyl.
A di-lower alkylamino group Am is, for example, dimethylamino, N-methyl-N-ethylamino, diethylamino, di-n-propylamino, di-isopropylamino or di-n-butylamino, and lower alkyleneimino represents, for example, ethyleneimino, pyrrolidino, 2-methylpyrrolidino, piperidino, 2- or 4-methyl-piperidino, 1,6- or 2,5-hexamethyleneimino, 1,7- or 2,6-heptamethyleneimino.
The compounds of the invention possess valuable pharmacological properties. For example, they exhibit antiinflammatory effects, as can be demonstrated in animal tests, using advantageously mammals, such as rats, as test objects. Such tests can be performed, for example, according to Winter et al., Proc. Soc., Exp. Biol. and Med. 111, 544 (1962). According to it, the compounds of the invention are applied, in the form of aqueous solutions or suspensions, by stomach tube to male and female rats, in the dosage range between about 1 and 100 mg./kg./day, preferably between about 5 and 50 mg./kg./day, advantageously between about 10 and 25 mg./kg./day. About 1 hour later an aqueous suspension of carrageenin is injected into the rat's paw and any anti-inflammatory activity can be expressed by the reduction of the volume and/or weight of the edematous paw, as compared with the edematous paw volume or weight of untreated or placebo (saline) treated animals. Besides the above-mentioned utility, the compounds of this invention are also useful intermediates in the manufacture of other valuable products, particularly of pharmacologically active compounds.

Valuable compounds are those of Formula I, in which X is chloro or bromo, Am is di-lower alkylamino or lower alkyleneimino and R is hydrogen or lower alkyl, i.e. such with up to 7 carbons.

Particularly useful are compounds of Formula II

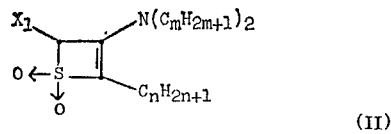

in which $X_1$ is chloro or bromo and each of $m$ and $n$ is an integer from 1 to 4.

Especially valuable are the compounds of Formula II, in which $X_1$ is chloro or bromo and each of $m$ and $n$ is the integer 1 or 2.

The compounds of the invention are prepared according to methods known in the art, e.g. by (a) reacting a halomethanesulfonyl halide with a ketone O,N- or N,N-acetyl, e.g. compounds of the formulae

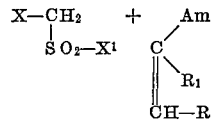

in which $X^1$ is a halogen atom, $R_1$ is a lower alkoxy or another Am group, or according to the new process by (b) reacting a halomethanesulfonyl halide with a di-lower lower alkyl- or lower alkylene-lower alkynylamine, e.g. compounds of the formulae

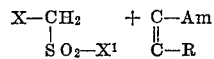

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of reactive derivatives or salts thereof. Mainly, those starting materials should be used in the process of the invention that lead to the formation of those compounds indicated above as being specially valuable.

The starting material used is known or, if new, may be prepared according to known methods, e.g. those described in Angew. Chem. 1967, p. 767 (744) or J. Org. Chem. 32, 990 (1967).

The compounds of the invention can be used, for example, in the form of pharmaceutical or veterinary compositions, containing them in conjunction or admixture with inorganic or organic, solid or liquid pharmaceutical excipients suitable especially for enteral, but also parenteral or topical administration. Suitable excipients are substances that do not react with the compounds of the invention, for example, water, gelatine, gums, sugars, e.g. lactose, glucose or sucrose, starches, e.g. corn starch or arrow-root, stearic acid or salts thereof, e.g. magnesium or calcium stearate, talc, alcohols, e.g. stearyl or benzyl alcohol, propylene glycol or polyalkylene glycols, alginic acid and other known medicinal excipients. The compositions may be, for example, tablets or pills, e.g. micropills, or in liquid form as solutions, suspensions or emulsions. They may be sterilized and/or contain adjuvants, such as preserving, stabilizing, wetting or emulsifying agents, solution promotors, salts for regulating the osmotic pressure or buffers. They are prepared by conventional methods and contain about 0.1 to 75%, more particularly, 1 to 50%, of the active ingredient.

The following examples are intended to illustrate the invention and are not to be construed as being limitations thereon. Temperatures are given in degrees centigrade, and all parts wherever given are parts by weight.

EXAMPLE 1

To the mixture of 10 g. 1-diethylamino-1-propyne, 9.5 g. triethylamine and 50 ml. tetrahydrofuran, the solution of 13.4 g. chloromethanesulfonyl chloride in 75 ml. tetrahydrofuran is added dropwise while stirring under nitrogen and keeping the temperature at −10°. The reaction mixture is allowed to warm up to room temperature and is stirred for 2 hours. It is filtered, the filtrate evaporated in vacuo and the residue is taken up in the minimum amount of ethanol-diethyl ether. The solution is kept in the refrigerator overnight, the precipitate formed filtered off and washed with ethanol-diethyl ether, to yield the 2-chloro-3-diethylamino-4-methyl-2H - thiete - 1,1 - dioxide of the formula

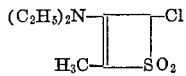

melting at 79–80°.

EXAMPLE 2

To the mixture of 10 g. 1-diethylamino-1-propyne, 9.5 g. triethylamine and 50 ml. tetrahydrofuran, the solution of 17.45 g. bromomethanesulfonyl chloride in 50 ml. tetrahydrofuran is added dropwise while stirring under nitrogen and keeping the temperature at −10°. The mixture is allowed to warm up to room temperature and is stirred for 2 hours. It is filtered, the filtrate evaporated in vacuo, residue triturated with ethanol and recrystallized from ethyl acetate-hexane, to yield to the 2-bromo-3-diethylamino-4-methyl-2H-thiete-1,1-dioxide of the formula

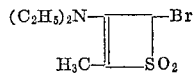

melting at 88–90°.

EXAMPLE 3

Preparation of 10,000 tablets each containing 25 mg. of the active ingredient:

Formula

| | G. |
|---|---|
| 2 - chloro - 3 - diethylamin - 4 - methyl - 2H-thiete - 1,1 - dioxide | 250.00 |
| Lactose | 1,956.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure

All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

What is claimed is:

1. An anti-inflammatory pharmaceutical composition comprising an anti-inflammatory effective amount of a compound having the formula in which $X_1$ is chloro or bromo, $N(C_mH_{2m+1})_2$ is dimethylamino, diethylamino, di-n-propylamino, di-isopropylamino or di-n-butylamio, and $C_nH_{2n+1}$ is methyl, ethyl, n-propyl, i-propyl, n-butyl or i-butyl, together with a pharmaceutical excipient.

References Cited

Rosen, Tetrahedron Letters, No. 8, February 1969, pp. 647–650.

Hasek et al., J. Org. Chem., vol. 30 (1965), pp. 1495–1498.

JEROME D. GOLDBERG, Primary Examiner

U.S. Cl. X.R.

424—267, 274; 260—293.4 E, 326.8 Z, 327 R

PO-1050
(5/69)

UNITED STATES PATENT OFFICE
CERTIFICATE OF CORRECTION

Patent No. 3,644,632  Dated February 22, 1972

Inventor(s) Melvin Harris Rosen et al

It is certified that error appears in the above-identified patent and that said Letters Patent are hereby corrected as shown below:

Column 1, lines 5-6, delete "CIBA Corporation, Summit, N. J." and substitute --- CIBA-GEIGY Corporation, Ardsley, N. Y. ---

Signed and sealed this 16th day of April 1974.

(SEAL)
Attest:

EDWARD M. FLETCHER, JR.
Attesting Officer

C. MARSHALL DANN
Commissioner of Patents